(12) United States Patent
Chen et al.

(10) Patent No.: US 10,936,042 B2
(45) Date of Patent: *Mar. 2, 2021

(54) METHOD AND APPARATUS FOR SUPPLYING POWER TO A PROCESSOR

(71) Applicant: EMC IP Holding Company LLC, Hopkinton, MA (US)

(72) Inventors: Jing Chen, Epping (AU); Tao Yang, Shanghai (CN); Jesse Xizhi Cui, Shanghai (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,180

(22) Filed: Feb. 18, 2020

(65) Prior Publication Data

US 2020/0183475 A1 Jun. 11, 2020

Related U.S. Application Data

(63) Continuation of application No. 15/382,979, filed on Dec. 19, 2016, now Pat. No. 10,564,696.

(30) Foreign Application Priority Data

Dec. 28, 2015 (CN) .......................... 201511001586.4

(51) Int. Cl.
*G06F 1/26* (2006.01)
*G06F 1/324* (2019.01)
(Continued)

(52) U.S. Cl.
CPC .............. *G06F 1/324* (2013.01); *G06F 1/206* (2013.01); *G06F 1/263* (2013.01); *G06F 1/3287* (2013.01); *G06F 1/3293* (2013.01); *Y02D 10/00* (2018.01)

(58) Field of Classification Search
None
See application file for complete search history.

(56) References Cited

U.S. PATENT DOCUMENTS 8,384,244 B2 * 2/2013 Peterson ................... H02J 9/08
307/66
9,874,919 B2 1/2018 Jau et al.
(Continued)

FOREIGN PATENT DOCUMENTS

CN 104238719 A 12/2014
CN 104991626 A 10/2015
(Continued)

OTHER PUBLICATIONS

Non-Final Office Action issued in related U.S. Appl. No. 15/382,979 dated Sep. 21, 2018.
(Continued)

*Primary Examiner* — Fahmida Rahman
(74) *Attorney, Agent, or Firm* — Brian J. Colandreo; Mark H. Whittenberger; Holland & Knight LLP

(57) ABSTRACT

Embodiments of the present disclosure provide a method, an apparatus, an additional power supply, and a mainboard system for supplying power to a processor. The method comprises determining whether an additional power supply is able to provide extra power required by a processor in response to receiving a first signal from a power supply unit that supplies power to the processor. The first signal indicates that the power required by the processor exceeds maximum power that can be provided by the power supply unit. The method further comprises supplying power to the processor by at least the additional power supply in response to determining that the additional power supply is able to provide extra power. The embodiments of the present disclosure can supply the required extra power to the processor (Continued)

from the additional power supply so as to optimize the performance of the processor in an acceleration mode.

16 Claims, 9 Drawing Sheets

(51) Int. Cl.
*G06F 1/20* (2006.01)
*G06F 1/3287* (2019.01)
*G06F 1/3293* (2019.01)

(56) References Cited

U.S. PATENT DOCUMENTS

| | | |
|---|---|---|
| 10,564,696 B2 | 2/2020 | Chen et al. |
| 2005/0086545 A1 | 4/2005 | Breen et al. |
| 2006/0255755 A1 | 11/2006 | Shu et al. |
| 2010/0102625 A1 | 4/2010 | Karimi et al. |
| 2013/0339757 A1 | 12/2013 | Reddy |
| 2014/0229748 A1 | 8/2014 | Li et al. |
| 2014/0281618 A1 | 9/2014 | Sultenfuss et al. |
| 2015/0293569 A1* | 10/2015 | Yu ................ G06F 1/3212 713/300 |
| 2017/0185131 A1 | 6/2017 | Chen et al. |

FOREIGN PATENT DOCUMENTS

| | | |
|---|---|---|
| CN | 105005372 A | 10/2015 |
| CN | 105159428 A | 12/2015 |

OTHER PUBLICATIONS

Final Office Action issued in related U.S. Appl. No. 15/382,979 on May 2, 2019.
Notice of Allowance issued in related U.S. Appl. No. 15/382,979 dated Sep. 10, 2019.
Notification of the First Chinese Office Action issued in related CN Application Serial No. 2015110015864 dated May 27, 2019.
Notification of the Rejection Decision issued in related Chinese Application Serial No. 201511001586.4 dated May 25, 2020, 8 pages.

* cited by examiner

METHOD AND APPARATUS FOR SUPPLYING POWER TO A PROCESSOR

RELATED APPLICATIONS

The subject application is a continuation of U.S. application Ser. No. 15/382,979; filed Dec. 19, 2016, which claims priority from Chinese Patent Application Number CN201511001586.4, filed on Dec. 28, 2015 at the State Intellectual Property Office, China, titled "METHOD AND APPARATUS FOR SUPPLYING POWER TO A PROCESSOR," the contents of which are herein incorporated by reference in its entirety.

FIELD

Embodiments of the present disclosure generally relate to the field of processors, and more specifically relate to a method, an apparatus, an additional power supply, and a mainboard system for supplying power to a processor.

BACKGROUND

In a computer system, an overall performance of the system is dominated by a central processing unit (CPU) of a platform. Generally, a CPU with a higher performance will obtain more power from a power supply unit (PSU) of the system. A CPU with an acceleration mode may enhance its performance by increasing its clock frequency within a short time, e.g., the CPU with a TurboBoost™ mode designed by the Intel™ Corp. However, this requires more extra power from the PSU. When a work load on the processor calls for a higher performance and the processor is below its power, current and thermal limits, the clock of the processor will increase its operating frequency to meet the demand. For example, for the Core™ i7-920XM processor, the normal operating frequency is 2.0 GHz. While in the acceleration mode, a maximum frequency of a single core will increase to 3.2 GHz.

However, in current system architecture, due to limit of the required extra power, the CPU acceleration mode possibly cannot be implemented thoroughly. Once the power required by the CPU exceeds a peak power of the PSU, the PSU will transmit a PROCHOT # signal to the CPU to force the CPU to reduce its clock frequency. However, reduction of the clock frequency means degrading the computing performance of the CPU.

Therefore, a method is desired in the art to solve the problems above, with an objective of optimizing the CPU performance.

SUMMARY

Embodiments of the present disclosure intend to provide a method, an apparatus, an additional power supply, and a mainboard system for supplying power to a processor.

According to a first aspect of the present disclosure, there is provided a method for supplying power to a processor, the method comprises, in response to receiving a first signal from a power supply unit that supplies power to a processor, determining whether an additional power supply is able to provide extra power required by the processor, the first signal indicating that the power required by the processor exceeds maximum power that can be provided by the power supply unit. The method further comprises, in response to determining that the additional power supply is able to provide the extra power, supplying power to the processor by at least the additional power supply.

In some embodiments, the method further comprises, in response to determining that the additional power supply is unable to provide the extra power, transmitting a second signal to the processor so as to reduce a clock frequency of the processor.

In some embodiments, the method further comprises, in response to absence of the first signal from the power supply unit, stop supplying power to the processor by the additional power supply.

In some embodiments, the method further comprises supplying power to the processor by the additional power supply in response to the power supply unit powering down.

According to a second aspect of the present disclosure, there is provided an apparatus for supplying power to a processor. The apparatus comprises a power determining module configured to, in response to receiving a first signal from a power supply unit that supplies power to a processor, determine whether an additional power supply is able to provide extra power required by the processor, the first signal indicating that a power required by the processor exceeds a maximum power that can be provided by the power supply unit. The apparatus further comprises a first control module configured to, in response to determining that the additional power supply is able to provide the extra power, cause at least the additional power supply to supply power to the processor.

In some embodiments, the first signal is received via a first reserved pin of the apparatus.

In some embodiments, the apparatus further comprises a second signal transmitting module configured to, in response to determining that the additional power supply is unable to provide the extra power, transmit a second signal to the processor so as to reduce a clock frequency of the processor.

In some embodiments, the second signal is transmitted via a second reserved pin of the apparatus.

In some embodiments, the apparatus further comprises a second control module configured to, in response to absence of the first signal from the power supply unit, cause the additional power supply to stop supplying power to the processor.

In some embodiments, the apparatus further comprises a third control module configured to, in response to the power supply unit powering down, cause the additional power supply to supply power to the processor.

According to a third aspect of the present disclosure, there is provided an additional power supply for supplying power to a processor. The additional power supply comprises an apparatus for controlling power supply to the processor. The apparatus is configured to, in response to receiving a first signal from a power supply unit that supplies power to a processor, determine whether the additional power supply is able to provide extra power required by the processor, the first signal indicating that power required by the processor exceeds maximum power that can be provided by the power supply unit. The apparatus is further configured to, in response to determining that the additional power supply is able to provide the extra power, cause at least the additional power supply to supply power to the processor.

In some embodiments, the first signal is received via a first reserved pin of the apparatus.

In some embodiments, the apparatus is further configured to, in response to determining that the additional power supply is unable to provide the extra power, transmit a second signal to the processor so as to reduce a clock frequency of the processor.

In some embodiments, the second signal is transmitted via a second reserved pin of the apparatus.

In some embodiments, the apparatus is further configured to, in response to absence of the first signal from the power supply unit, cause the additional power supply to stop supplying power to the processor.

In some embodiments, the apparatus is further configured to, in response to the power supply unit powering down, cause the additional power supply to supply power to the processor.

According to a fourth aspect of the present disclosure, there is provided a mainboard system. The mainboard system comprises a processor, a power supply unit for supplying power to the processor, an additional power supply, and a control unit. The control unit is configured to, in response to receiving a first signal from the power supply unit, determine whether the additional power supply is able to provide extra power required by the processor, the first signal indicating that the power required by the processor exceeds a maximum power that can be provided by the power supply unit. The control unit is further configured to, in response to determining that the additional power supply is able to provide the extra power, cause at least the additional power supply to supply power to the processor.

In some embodiments, the control unit receives the first signal from the power supply unit via a first reserved pin.

In some embodiments, the control unit is further configured to, in response to determining that the additional power supply is unable to provide the extra power, transmit a second signal to the processor so as to reduce a clock frequency of the processor.

In some embodiments, the control unit transmits the second signal to the processor via a second reserved pin.

In some embodiments, the control unit is further configured to, in response to absence of the first signal from the power supply unit, cause the additional power supply to stop supplying power to the processor.

In some embodiments, the control unit is further configured to, in response to the power supply unit powering down, cause the additional power supply to supply power to the processor.

In some embodiments, the control unit is located within the additional power supply.

According to a fifth aspect of the present disclosure, there is provided a computer program product for supplying power to a processor, the computer program product being tangibly stored on a non-transient computer readable medium and comprising computer-executable instructions which, when being executed, cause the computer to execute any step of the method.

The method, the apparatus, the additional power supply, and the mainboard system for supplying power to a processor according to the embodiments of the present disclosure can supply the required extra power to the processor from the additional power supply so as to optimize the performance of the processor in an acceleration mode.

BRIEF DESCRIPTION OF THE DRAWINGS

The accompanying drawings here provide further understanding of the present disclosure and constitute part of the present disclosure. The schematic embodiments of the present disclosure and their illustrations are used for explaining the present disclosure, which do not constitute improper limitations of the present disclosure. In the accompanying drawings.

In respective drawings, same or corresponding reference numerals represent same or corresponding portions.

DETAILED DESCRIPTION OF THE PREFERRED EMBODIMENTS

Hereinafter, various exemplary embodiments of the present disclosure will be described in detail with reference to the accompanying drawings. These drawings and depictions relate only to exemplary embodiments. It should be noted that according to the depictions below, alternative embodiments of the structures and methods disclosed here are easily envisaged, and without departing from the principle as disclosed here, these alternative embodiments may be used.

It should be understood that providing of these embodiments is only to enable those skilled in the art to better understand and then further implement the present disclosure, not intended to limit the scope of the present disclosure in any manner.

The terms "include," "comprise," or similar expressions should be understood as open terms, i.e., "including, but not limited to." The term "based on" means "at least partially based on." The term "one embodiment" indicates "at least one embodiment"; the term "a further embodiment" indicates "at least one further embodiment." definitions of other terms will be provided below.

Hereinafter, a technical solution for supplying power to a processor according to the embodiments of the present disclosure will be described in detail with reference to the accompanying drawings.

Figure 1:
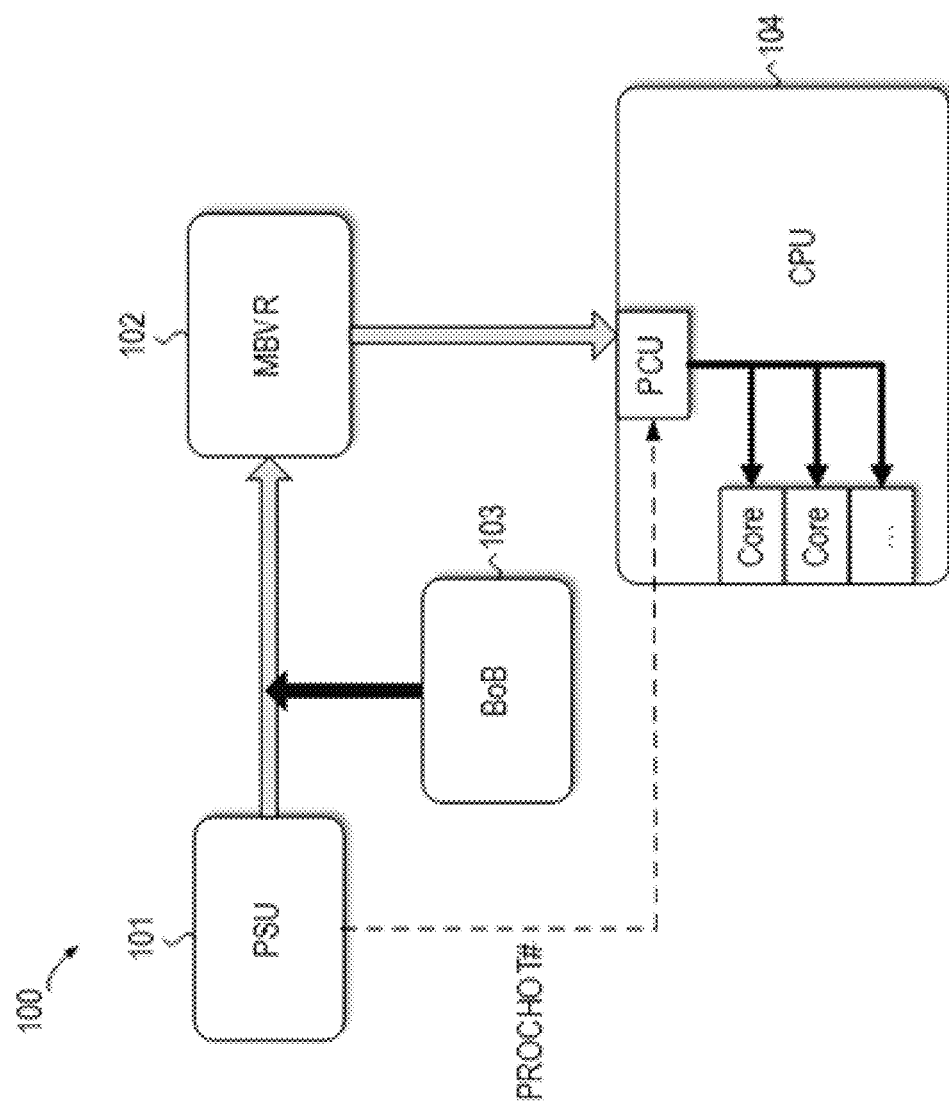
FIG. 1 illustrates an exemplary block diagram of an existing mainboard system architecture 100.

FIG. 1 illustrates an exemplary block diagram of existing mainboard system architecture 100. The system architecture 100 may include, for example, a PSU 101, a motherboard voltage regulator (MBVR) 102, a battery on bus (BoB, hereinafter also referred to as a battery module) 103, and a CPU 104. The MBVR 102 may be used to drive the CPU 104. It should be understood that the system architecture illustrated in FIG. 1 is only exemplary, which only shows components related to the embodiments of the present disclosure, rather than all components in the existing system. The CPU 104 may be a processor with a single core or a multi-core processor illustrated in FIG. 1. The CPU 104 includes a power control unit (PCU). When the PSU 101 is powered on, the BoB 103 is in a charging state, and the MBVR 102 may be powered by the PSU 101. During the acceleration mode, when the power obtained by the CPU 104 exceeds a peak power of the PSU 101, the PSU 101 may transmit a PROCHOT # signal to the CPU 104 to force the CPU 104 to reduce its clock frequency. Only when the PSU 101 powers down, the BoB 103 may provide power to the CPU through the MBVR 102. Therefore, in the existing system architecture illustrated in FIG. 1, the energy of the BoB 103 cannot be used to provide additional power to the CPU 104 in the acceleration mode.

Hereinafter, the structure of BoB 103 in the system architecture 100 will be further described in detail with reference to FIG. 2.

Figure 2:
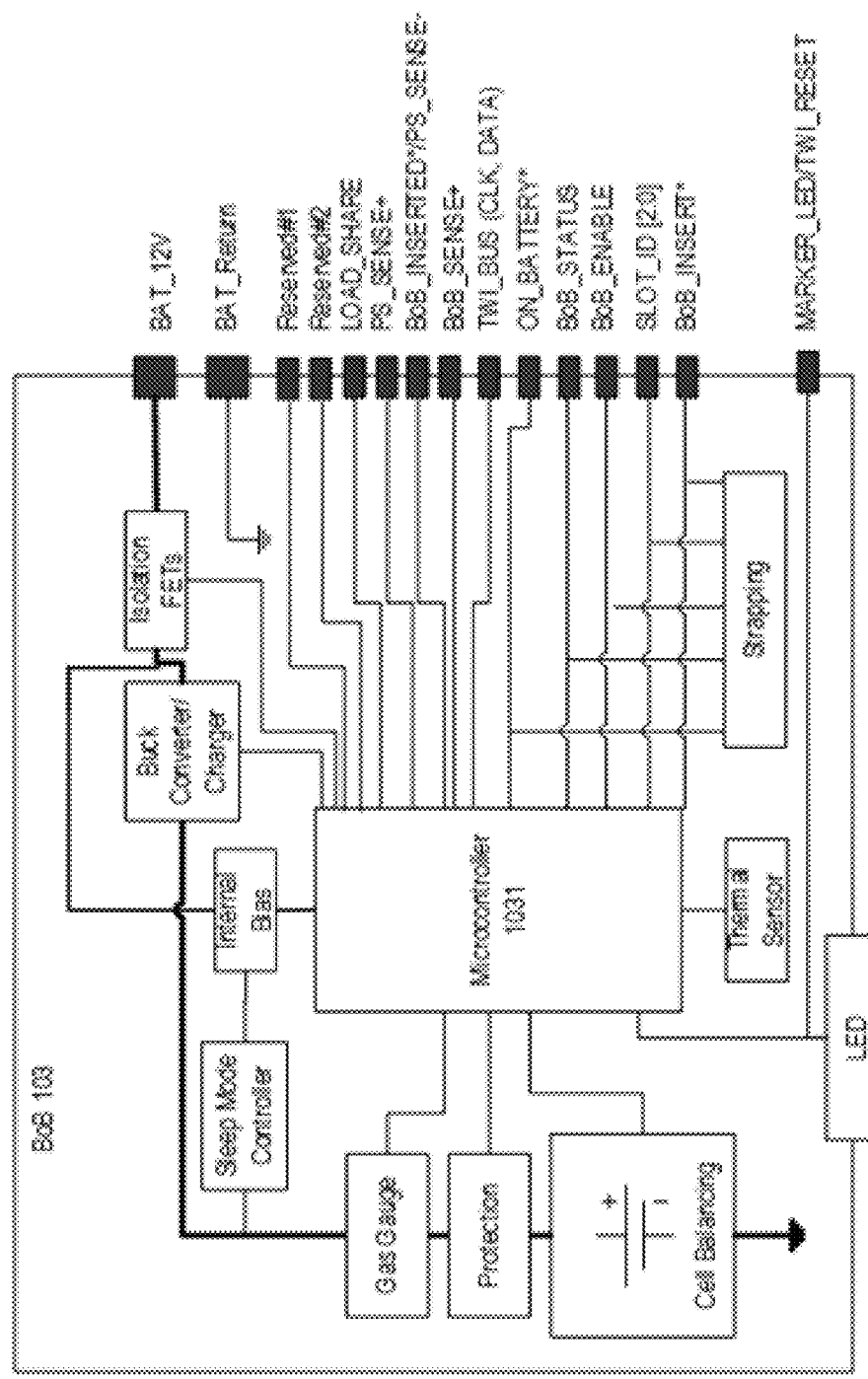
FIG. 2 illustrates a structural block diagram of a battery module in the existing mainboard system architecture 100.

FIG. 2 exemplarily illustrates a structural block diagram of the battery module in the existing processor system architecture 100. In one example, the battery module as shown in FIG. 2 may be the BoB 103 in FIG. 1. As illustrated in FIG. 2, in the exemplary structure of BoB 103, the core component is a microprocessor 1031, which is operated to perform battery management, communication, and buck control. As illustrated in FIG. 2, within an input output interface connected to the microprocessor 1031, there comprise two reserved pins: Reserved #1 and Reserved #2. The microprocessor 1031 in the BoB 103 also comprises a firmware. The firmware, when being executed by the microprocessor 1031, for example, may cause the BoB 103 to perform the following operations: when the PSU 101 illustrated in FIG. 1 powers up, the BoB 103 is in a charging state, which cannot provide power to the CPU 103; while when the PSU 101 powers down, the BoB 103 enters in a discharging state so as to provide power to the CPU 104. Therefore, the battery module in the existing processor system architecture as illustrated in FIG. 2 cannot be used to provide extra power to the CPU 104 in the acceleration mode.

Figure 3:
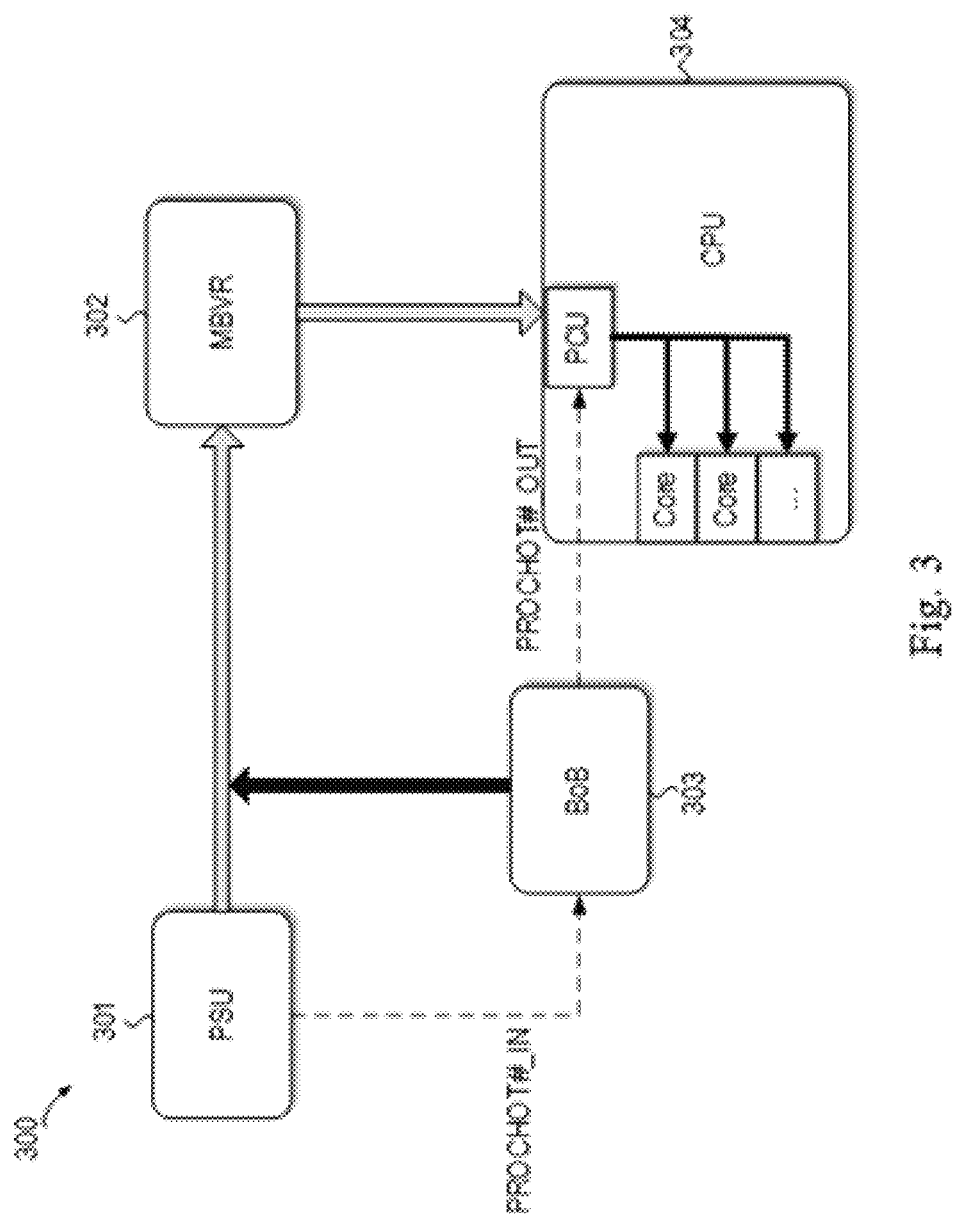
FIG. 3 illustrates an exemplary block diagram of a mainboard system architecture 300 according to the embodiments of the present disclosure.

In order to solve the problem above, embodiments of the present disclosure may provide a solution for supplying power to a processor. For example, FIG. 3 illustrates an exemplary block diagram of mainboard system architecture according to the embodiments of the present disclosure. Hereinafter, the differences between the mainboard system architecture according to the embodiments of the present disclosure and the existing mainboard system architecture will be depicted in detail with comparison over FIG. 1. Like the existing processor system architecture 100 in FIG. 1, the system architecture 300 according to the embodiments of the present disclosure as shown in FIG. 3 also comprises a PSU 301, a MBVR 302, a BoB 303, and a CPU 304. The MBVR 302 may be used to drive the CPU 304. The CPU 304 may be a processor having a single core or a processor having multiple cores as illustrated in FIG. 3, which includes a PCU. When the PSU 301 powers up, the BoB 303 may be in the charging state, while the MBVR 302 may be powered by the PSU 301. However, in contrast to FIG. 1, during the acceleration mode, when the power required by the CPU 304 exceeds a peak power of the PSU 301, the PSU 301 may first transmit to the BoB 303, rather than the CPU 304, a PROCHOT #_IN signal. When the BoB 303 can provide the required extra power, it may enter into a discharging state so as to power the CPU 304, such that the CPU 304 may keep running in the acceleration mode. When the power to be used by the BoB 303 exceeds the extra power it can provide, the BoB 303 may transmit a PROCHOT #_OUT signal to the CPU 304, thereby preventing accidental shutdown of the system. The PROCHOT #_OUT signal may force the CPU 304 to reduce its clock frequency so as to reduce the required power.

Figure 4:
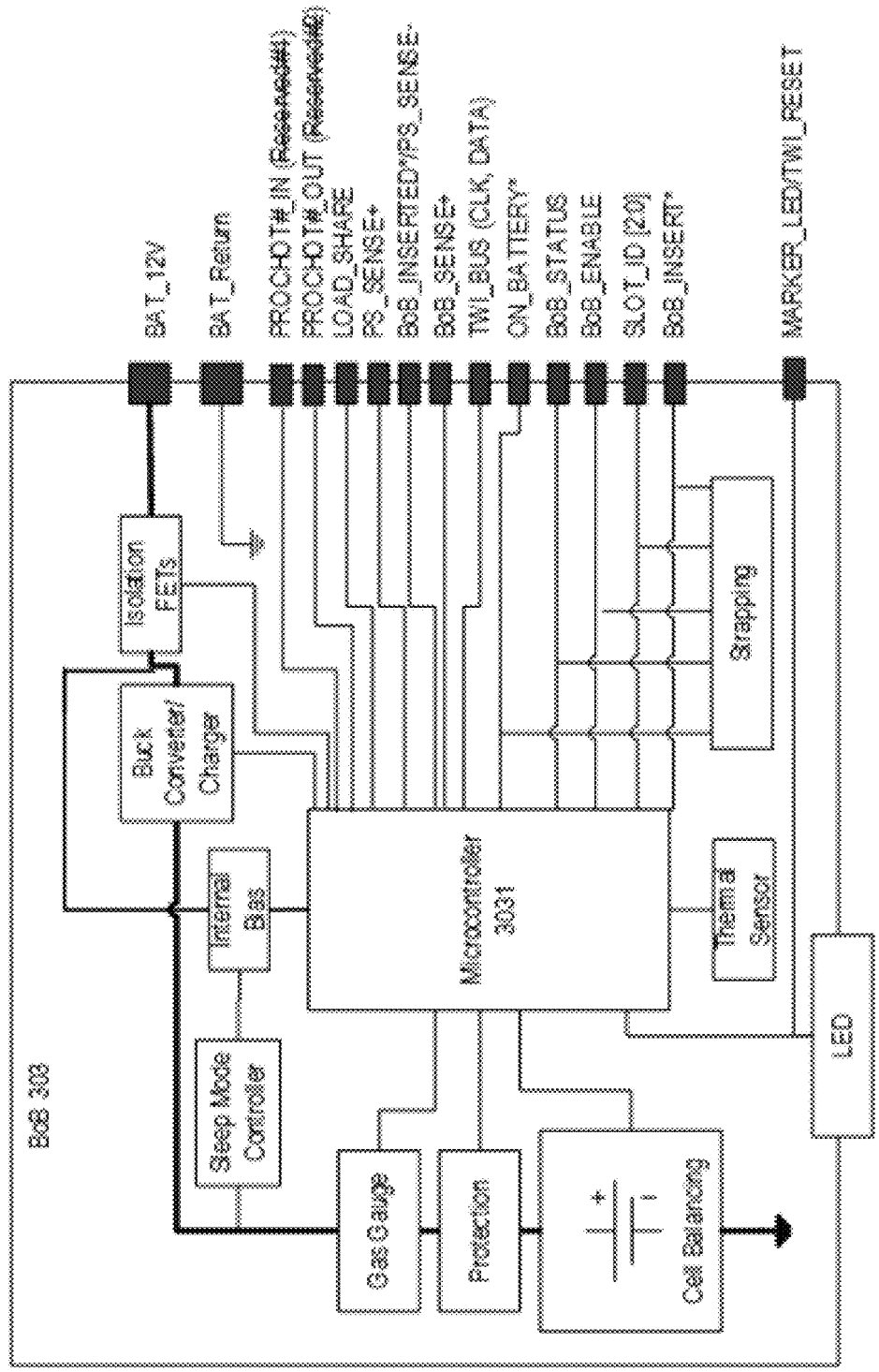
FIG. 4 illustrates a structural block diagram of a battery module in the mainboard system architecture 300 according to the embodiments of the present disclosure.

In order to implement the system architecture 300 as illustrated in FIG. 3, the embodiments of the present disclosure may provide a new battery module. For example, FIG. 4 exemplarily illustrates a structural block diagram of a battery module in the mainboard system architecture 300 according to the embodiments of the present disclosure. For example, the battery module as shown in FIG. 4 may be the BoB 303 in FIG. 3. As illustrated in FIG. 4, in an exemplary structure of the BoB 303, the microprocessor 3031 is operated to perform battery management, communication and buck control. In contrast to the existing battery module as illustrated in FIG. 2, within an input output interface connected to the microprocessor 3031, the reserved pin Reserved #1 (e.g., the Reserved #1 shown in FIG. 2) may be connected to the PSU 301 as illustrated in FIG. 3 so as to receive the PROCHOT #_IN signal from the PSU 301. The reserved pin Reserved #_2 (e.g., the reserved pin Reserved #2 shown in FIG. 2) may be connected to the PCU in the CPU 304 as illustrated in FIG. 3, so as to output the PROCHOT #_OUT signal to the PCU. Besides, as will be described in further detail below, the firmware in the microprocessor 3031, when being executed by the microprocessor 3031, may cause the BoB 303 to perform the following operations: when the power required by the CPU 304 in the acceleration mode as shown in FIG. 3 exceeds the peak power of the PSU 301, the BoB 301 may receive the PROCHOT #_IN signal from the PSU 301. In response to the received PROCHOT #_IN signal, when the BoB 303 can provide the required extra power, it may enter into the discharging state so as to supply power to the CPU 304, such that the CPU 304 may keep running in the acceleration mode. When the energy used by the BoB 303 exceeds the extra power it can provide, the BoB 303 may transmit PROCHOT #_OUT to the CPU 304 so as to prevent accidental shutdown of the system. The PROCHOT #_OUT signal may force the CPU 304 to reduce its clock frequency so as to reduce the required power.

Figure 5:
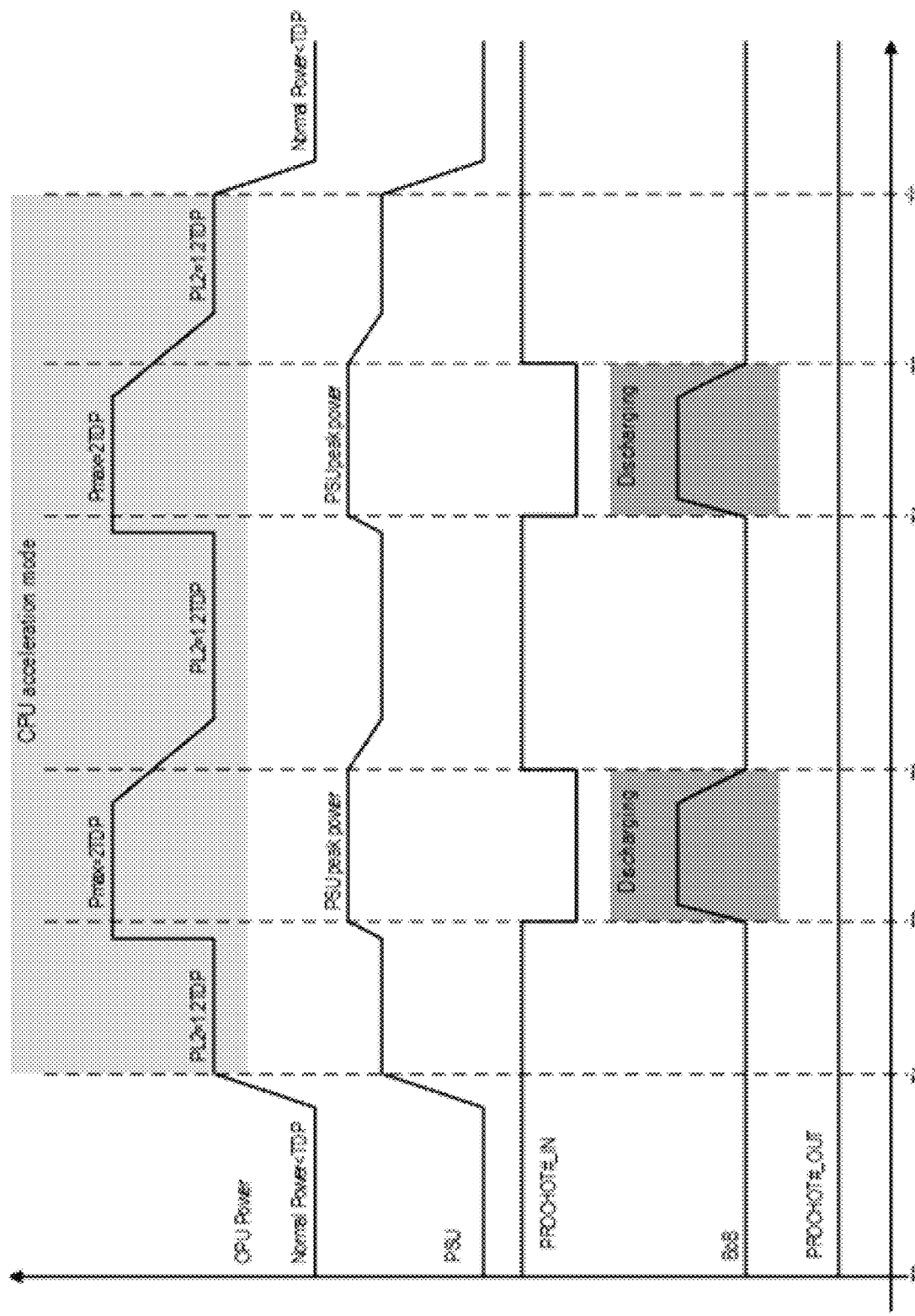
FIG. 5 illustrates states of various components in the mainboard system architecture 300 and timing illustration of respective signals according to the embodiments of the present disclosure.

FIG. 5 illustrates states of various components in the mainboard system architecture 300 and timing illustration of respective signals according to the embodiments of the present disclosure. In FIG. 5, the transverse coordinate axis represents time, where T0-T6 represent 7 different times, respectively. The five folding lines in the figure represent variation of CPU state, PSU state, PROCHOT #_IN signal, BoB state, and PROCHOT #_OUT with time, respectively.

As illustrated in FIG. 5, during T0-T1, the CPU is in a normal working mode, the power required by which is less than a thermal design power (TDP). Therefore, it is only powered by the PSU. At T1, the CPU enters in an acceleration mode. During T1-T2, the CPU in the acceleration mode demands a 1.2 times of TDP. Because it does not exceed the peak power of the PSU, it is still powered only by the PSU. At T2, the CPU demands twice of TDP, which exceeds the peak power of the PSU. Therefore, the PSU transmits a PROCHOT #_IN signal to the BoB. During T2-T3, the BoB is in a discharging state, providing the CPU with a demanded extra power exceeding the PSU peak power. At T3, the CPU demands 1.2 times of TDP. Because it does not exceed the peak power of the PSU, the PSU does not transmit a PROCHOT #_IN signal to the BoB, such that the BoB exits from the discharging state and will not supply power to the CPU. During T3-T4, the CPU demands 1.2 times of TDP. Therefore, the CPU is only powered by the PSU. This period of time may be referred to as a hold time (Thold). At T4, the CPU demands twice of TDP, which exceeds the peak power of the PSU. Therefore, the PSU transmits a PROCHOT #_IN signal to the BoB. During T4-T5, the BoB is in the discharging state, providing the required extra power exceeding the PSU peak power. At T5, the CPU demands 1.2 times of TDP. Because it does not exceed the peak power of the PSU, the PSU will not transmit the PROCHOT #_IN signal to the BoB, such that BoB exits from the discharging state and will not supply power to the CPU. During T5-T6, the CPU demands 1.2 times of TDP, so the CPU is only powered by the PSU. At T6, the CPU will return to the normal working mode and is only powered by the PSU. It may be seen from FIG. 6 that according to the embodiments of the present disclosure, when the power required by the CPU exceeds the peak power of the PSU, the PSU may transmit a PROCHOT #_IN signal to the BoB, such that the BoB starts discharging to provide extra power to the CPU. At this point, the BoB and the PSU may work in a parallel mode, where the CPU is still mainly powered by the PSU, while the BoB provides the extra power to the CPU. When the power demanded by the CPU is reduced below the peak power of the PSU, the BoB may exit from the discharging state, and as usual, all powers demanded by the CPU may only be supplied by the PSU.

It may be seen that according to the embodiments of the present disclosure, during the acceleration mode, when the power demanded by the CPU exceeds the upper limit of power that can be provided by the PSU, the CPU will not be forced to reduce its clock frequency for ensuring normal running of the system. Instead, the extra power required thereby exceeding the PSU peak power may be provided by the BoB, such that the CPU can obtain as high performance as possible.

Figure 6:
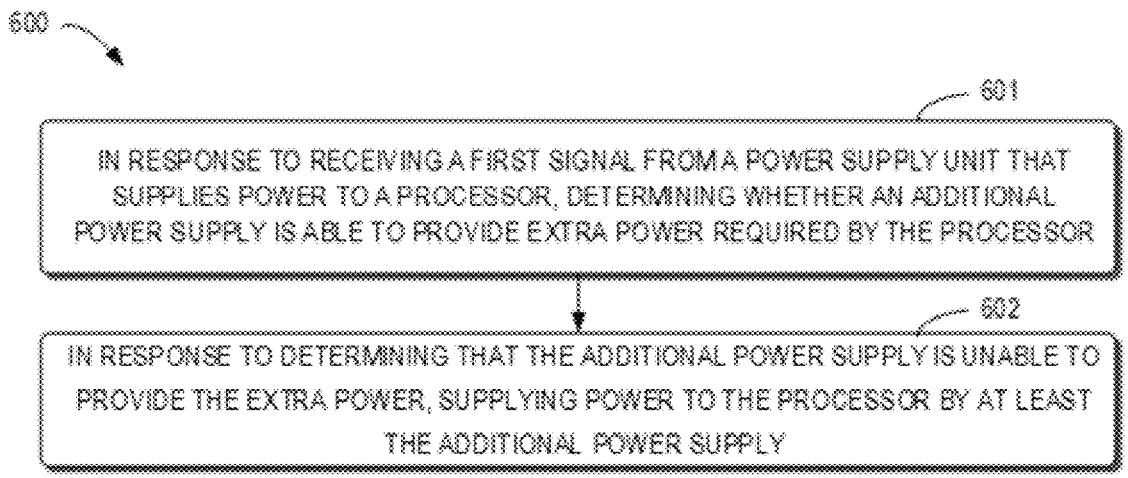
FIG. 6 illustrates a flow diagram of a method 600 for supplying power to a processor according to the embodiments of the present disclosure.

FIG. 6 illustrates a flow diagram of a method 600 for supplying power to a processor according to the embodiments of the present disclosure. Hereinafter, the method 600 will be described in detail with reference to FIG. 3. For example, the method 600 may be implemented on the BoB 303 as shown in FIG. 3 (and FIG. 4) (e.g., it may be implemented as a firmware in the microprocessor 3031 in the BoB 303) or may also be implemented on other separate device. The method 600 may comprise steps S601-S602.

At step S601, in response to receiving a first signal from a power supply unit that supplies power to a processor, determine whether an additional power supply is able to provide extra power required by the processor. The first signal indicates that the power required by the processor exceeds a maximum power that can be provided by the power supply unit. For example, the additional power supply here may be the BoB 303 as illustrated in FIG. 3. As illustrated in FIG. 3, when the power demanded by the CPU 304 in an acceleration mode exceeds the peak power of the PSU 301, the PSU 301 may transmit a PROCHOT #_IN signal to the BoB 303. In response to receiving the PROCHOT #_IN signal from the PSU 301, the BoB 303 may determine whether it can provide the demanded extra power.

Returning to FIG. 6, the method 600 proceeds to step S602. At step S602, supply power to the processor by at least the additional power supply in response to determining that the additional power supply is able to provide extra power. For example, as shown in FIG. 3, when the BoB 303 determines that it per se can provide the required extra power, the BoB 303 may enter into the discharging mode so as to supply power, together with the PSU 301, to the CPU 304. Therefore, during the acceleration mode, if the power demanded by the CPU 304 exceeds the upper limit of power that can be provided by the PSU, the CPU 304 will not be forced to reduce its clock frequency for ensuring normal running of the system. Instead, the required extra power exceeding the peak power of the PSU 301 may be provided by the BoB 303, such that the CPU 304 can achieve as high performance as possible.

According to the embodiments of the present disclosure, the method 600 may comprise the following optional step: in response to determining that the additional power supply cannot provide extra power, transmitting a second signal to the processor so as to reduce the clock frequency of the processor. For example, as illustrated in FIG. 3, when the BoB 303 determines that it per se cannot provide the demanded extra power, the BoB 303 may transmit a PROCHOT #_OUT signal to the CPU 304 so as to prevent the system from accidental shutdown. The PROCHOT #_OUT signal may force the CPU 304 to reduce its clock frequency so as to reduce the demanded power.

According to the embodiments of the present disclosure, the method 600 may comprise the following optional step: in response to not receiving the first signal from the power supply unit, stopping supplying power to the processor by the additional power supply. For example, as illustrated in FIG. 3, when the power demanded by the CPU 304 does not exceed the peak power of the PSU 301, the PSU 301 may not transmit the PROCHOT #_IN signal to the BoB 303. So the BoB 303 may be caused to exit from the discharging mode, without supplying power to the CPU 304.

According to the embodiments of the present disclosure, the method 600 may also comprise the following optional step: supplying power to the processor by the additional power supply in response to the power supply unit powering down. For example, as illustrated in FIG. 3, when the PSU 301 powers down, the BoB 303 may enter into the discharging mode so as to separately supply power to the CPU 304.

For the sake of clarity, some optional steps of the method 600 are not shown in FIG. 6. However, it should be understood that various features described above with reference to FIGS. 3-5 are likewise applicable to the method 600. In particularity, according to the embodiments of the present disclosure, the method 600 described with reference to FIG. 6 may be implemented as computer software program. For example, the embodiments of the present disclosure comprise a computer program product that is tangibly embodied on a non-transient computer readable medium and comprises computer executable instructions which, when being executed, cause the computer to execute any step of the method 600.

Figure 7:
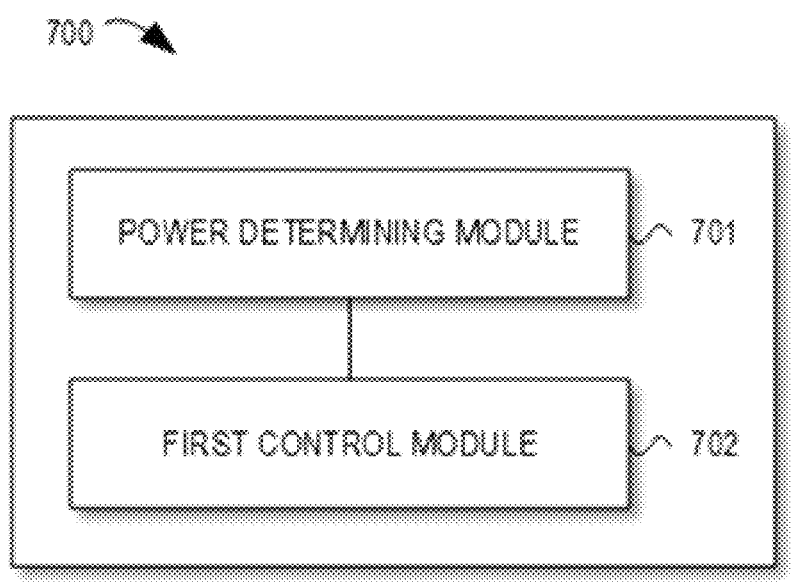
FIG. 7 illustrates a block diagram of an apparatus 700 for controlling power supply to a processor according to the embodiments of the present disclosure.

FIG. 7 illustrates a block diagram of an apparatus 700 for controlling power supply to a processor according to the embodiments of the present disclosure. For example, the apparatus 700 may be implemented on the BoB 303 as shown in FIG. 4 or may also be implemented on other separate device. The apparatus 700 may comprise a power determining module 701 configured to determine whether an additional power supply can provide extra power required by a processor in response to receiving a first signal from a power supply unit that supplies power to the processor. The first signal indicates that the power required by the processor exceeds a maximum power that can be provided by the power supply unit. The apparatus further comprises a first control module 702 configured to, in response to determining that the additional power supply can provide the extra power, cause at least the additional power supply to supply power to the processor.

According to some embodiments of the present disclosure, the first signal may be received via a first reserved pin of the apparatus 700. For example, the first signal may be received via the first reserved pin (i.e., Reserved #1) of the microprocessor 3031 in the BoB 303 as illustrated in FIG. 4.

According to some embodiments of the present disclosure, the apparatus 700 may further comprise a second signal transmitting module configured to, in response to determining that the additional power supply cannot provide extra power, transmit a second signal to the processor so as to reduce the clock frequency of the processor.

According to some embodiments of the present disclosure, the second signal may be transmitted via a second reserved pin of the apparatus 700. For example, the second signal may be received via the second reserved pin (i.e., Reserved #2) of the microprocessor 3031 in the BoB 303 as illustrated in FIG. 4.

In some embodiments, the apparatus 700 may further comprise a second control module configured to, in response to not receiving the first signal from the power supply unit, cause the additional power supply to stop supplying power to the processor.

In some embodiments, the apparatus 700 may further comprise a third control module configured to, in response to the power supply unit powering down, cause the additional power supply to supply power to the processor.

For the sake of clarity, some optional modules of the apparatus 700 are not illustrated in FIG. 7. However, it should be understood that various features described above with reference to the present disclosure are likewise applicable to the apparatus 700. Moreover, various modules in the apparatus 700 may be hardware modules or software modules. For example, in some embodiments, the apparatus 700 may be partially or completely implemented by software and/or hardware, e.g., implemented as a computer program product embodied on a computer readable medium. Alternatively or additionally, the apparatus 700 may be partially or completely implemented based on hardware, for example, implemented as an integrated circuit (IC), an application-specific integrated circuit (ASIC), a system-on-chip (SOC), a field programmable gate array (FPGA), etc. Scope of the present disclosure is not limited in this aspect.

Figure 8:
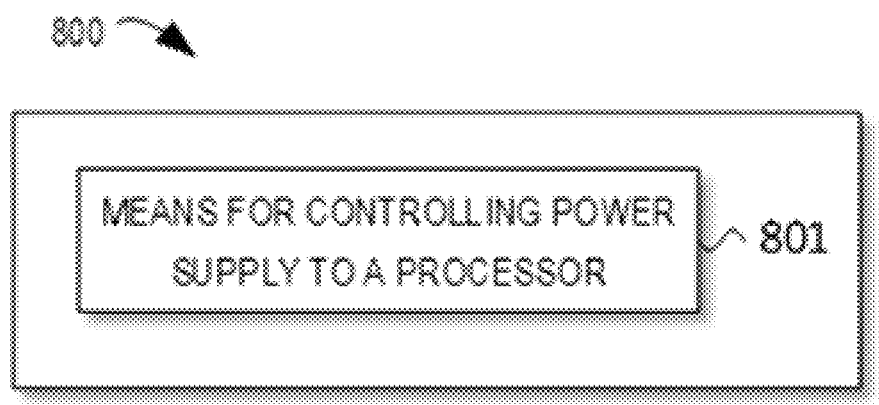
FIG. 8 illustrates a block diagram of an additional power supply 800 for supplying power to a processor according to the embodiments of the present disclosure.

FIG. 8 illustrates a block diagram of an additional power supply 800 for supplying power to a processor according to the embodiments of the present disclosure. For example, the additional power supply 800 may be implemented in the BoB 303 as illustrated in FIGS. 3 and 4. According to the embodiments of the present disclosure, the additional power supply 800 may comprise means 801 for controlling power supply to the processor. For example, the means 801 may be implemented as the microprocessor 3031 on the BoB 303 shown in FIG. 4.

According to the embodiments of the present disclosure, the means 801 is configured to determine whether an additional power supply can provide extra power required by a processor in response to receiving a first signal from a power supply unit that supplies power to the processor. The first signal indicates that the power required by the processor exceeds a maximum power that can be provided by the power supply unit. For example, the first signal may be received via a first reserved pin of the means 801 (e.g., the first signal may be received via the pin Reserved #1 of the microprocessor 3031 on the BoB 303 as shown in FIG. 4). The means 801 may further be configured to cause at least the additional power supply 800 to supply power to the processor in response to determining that the additional power supply 800 can provide the extra power.

According to the embodiments of the present disclosure, the means 801 may be further configured to transmit, by the additional power supply 800, a second signal to the processor in response to determining that the additional power supply 800 cannot provide the extra power, so as to reduce a clock frequency of the processor. For example, the second signal may be transmitted via a second reserved pin of the means 801 (e.g., the second signal may be transmitted by the pin Reserved #2 of the microprocessor 3031 on the BoB 303 as shown in FIG. 4).

According to the embodiments of the present disclosure, the means 801 may be further configured to, in response to not receiving the first signal from the power supply unit, cause the additional power supply 800 to stop supplying power to the processor.

According to the embodiments of the present disclosure, the means 801 may be further configured to, in response to the power supply unit powering down, cause the additional power supply 800 to supply power to the processor.

Figure 9:
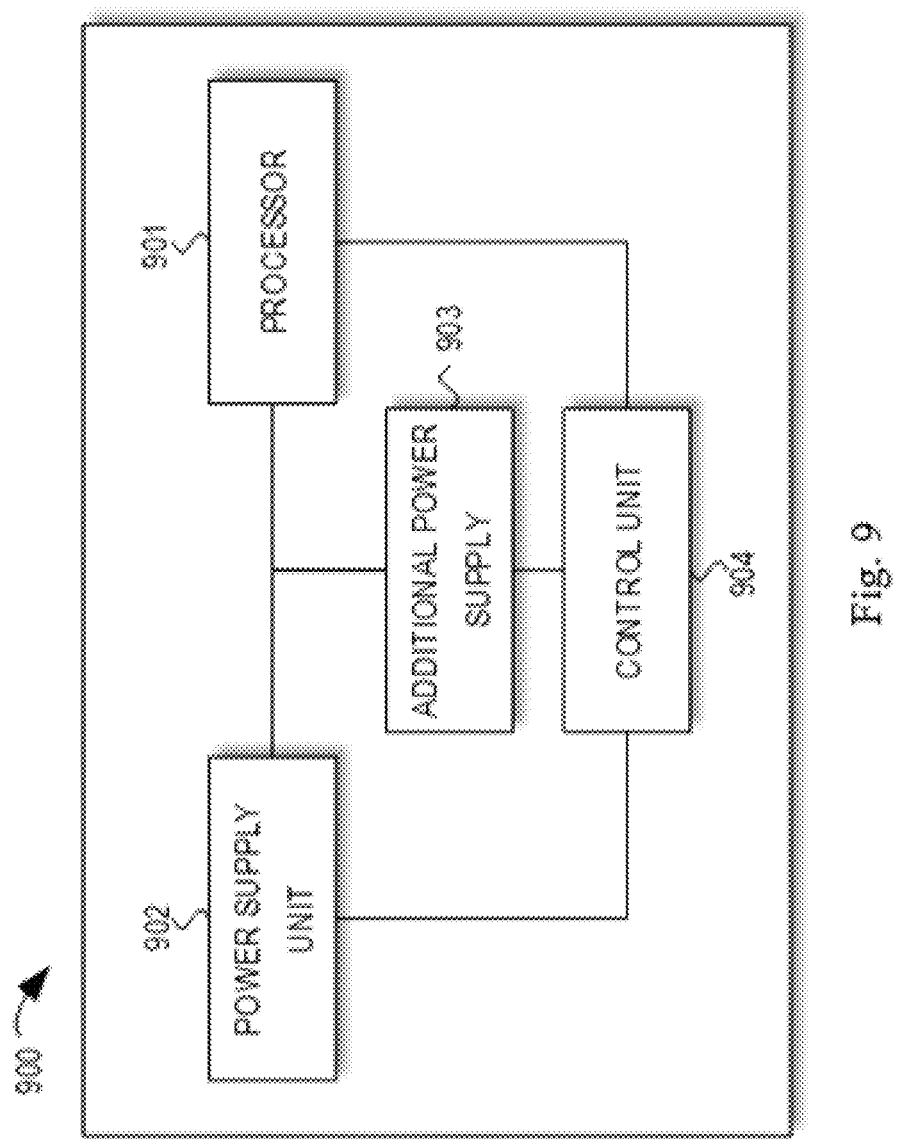
FIG. 9 illustrates a block diagram of a mainboard system 900 according to the embodiments of the present disclosure.

FIG. 9 illustrates a block diagram of a mainboard system 900 according to the embodiments of the present disclosure. For example, the mainboard system 900 may be implemented as the mainboard system architecture 300 as shown in FIG. 3. The mainboard system 900 comprises a processor 901, a power supply unit 902 for supplying power to the processor 901, an additional power supply 903, and a control unit 904. According to the embodiments of the present disclosure, the control unit 904 may be located in the additional power supply 903. For example, the processor 901 in the mainboard system 900 may be implemented as the CPU 304 as illustrated in FIG. 3, the power supply unit 902 may be implemented as the PSU 301 as illustrated in FIG. 3, the additional power supply 903 may be implemented as the BoB 303 as illustrated in FIG. 3, and the control unit 904 may be implemented as the microprocessor (e.g., the microprocessor 3031 as shown in FIG. 4) in BoB 303 or as other separate device.

According to the embodiments of the present disclosure, in the mainboard system 900, the control unit 904 is configured to determine whether an additional power supply 903 can provided extra power required by the processor 901 in response to receiving a first signal from the power supply unit 902. The first signal indicates that the power required by the processor 901 exceeds a maximum power that can be provided by the power supply unit 902. The control unit 904 is further configured to casue to supply power to the processor 901 by at least the additional power supply 903 in response to determining that the additional power supply 903 can provide extra power. For example, the control unit 904 may receive the first signal from the power supply unit 902 via the first reserved pin.

According to some embodiments of the present disclosure, the control unit 904 is further configured to in response to determining that the additional power supply 903 cannot provide the extra power, transmit a second signal to the processor 901 so as to reduce a clock frequency of the processor 901. For example, the control unit 904 may transmit the second signal to the processor 901 via the second reserved pin.

According to some embodiments of the present disclosure, the control unit 904 is further configured to, in response to not receiving the first signal from the power supply unit 902, cause the additional power supply 903 to stop supplying power to the processor 901.

According to some embodiments of the present disclosure, the control unit 904 is further configured to, in response to the power supply unit 902 powering down, cause the additional power supply 903 to supply power to the processor 901.

In view of the above, according to the embodiments of the present disclosure, there is provided a method, an apparatus therefor, an additional power supply and a mainboard system for supplying power to a processor. Compared with the traditional solution, the embodiments of the present disclosure can provide the desired extra power from the additional power supply to the processor, so as to optimize the performance of the processor in the acceleration mode.

Generally, various exemplary embodiments of the present disclosure may be implemented in hardware or a specific circuit, software, logic, or any combination thereof. Some aspects may be implemented in hardware, while other aspects may be implemented in firmware or software executable by a controller, a microprocessor, or other computing device. When various aspects of the embodiments of the present disclosure are illustrated or described with block diagrams, flow diagrams or other graphical representations, it would be appreciated that the blocks, apparatuses, systems, technologies or methods described here may be implemented as non-limitative examples in hardware, software, firmware, specific circuit or logic, general hardware or controller or other computing device, or some combinations thereof.

Moreover, respective blocks in the flow diagram may be regarded as method steps, and/or operations generated by computer program code, and/or understood as a plurality of multiple logical circuit elements for performing relevant functions. For example, embodiments of the present disclosure include a computer program product that includes a computer program tangibly embodied on a machine readable medium, the computer program including program code configured to implement the above described methods.

Within the context of the present disclosure, the machine readable medium may be any tangible medium including or storing programs for or related to the instruction execution system, apparatus, or device. The machine readable medium may include, but not limited to, electronic, magnetic, optical, electro-magnetic, infrared or semiconductor system, apparatus or device, or any combination thereof. Mode detailed examples of the machine-readable storage medium include an electric connection with one or more wires, a portable computer magnetic disk, hard disk, random access memory (RAM), read-only memory (ROM), erasable programmable read-only memory (EPROM or flash memory), optical storage device, magnetic storage device, or any appropriate combination thereof.

The computer program code for implementing the methods of the disclosure may be compiled with one or more programming languages. These computer program code may be provided to a processor of a general computer, a dedicated computer or other programmable data processing device, such that the program code, when being executed by a computer or other programmable data processing device, causes functions/operations specified in the flow diagrams and/or blocks to be implemented. The program code may be executed completely on the computer, partially on the computer, as an independent software packet, partially on the computer while partially on a remote computer, or completely on the remote computer or server.

Additionally, although the operations are described in a specific order, it should not be understood that such operations are performed in the shown specific order or in a successive order, or all of the shown operations are performed to obtain a desired result. In some cases, multi-task or parallel processing would be beneficial. Likewise, although some specific implementation details are included in the above discussion, it should not be explained as limiting the scope of any invention or claims, but should be explained as a depiction that may be directed to a specific embodiment of a specific invention. Some features described in the contexts of separate embodiments may also be consolidated and implemented in a single embodiment. Alternatively, various features depicted in the context of a single embodiment may also be scattered and implemented in a plurality of embodiments or in any appropriate sub-combinations.

Various modifications and changes to the exemplary embodiments of the present disclosure will become apparent to those skilled in the art when viewing the above description along with the accompanying drawings. Any and all modifications will still fall within the scope of the non-limitative exemplary embodiments of the present disclosure. Besides, the above description and drawings have teaching benefits. Those skilled in the art related to these embodiments of the present disclosure will contemplate other embodiments of the present disclosure as illustrated here.

It would be appreciated that the embodiments of the present disclosure are not limited to specific embodiments of the present disclosure, and modifications and other embodiments should all be included within the scope of the appended claims. Although specific terms are used here, they are only used in general and descriptive senses, not for a purpose of limitation.

What is claimed:

1. A method for supplying power to a processor, comprising:
   in response to receiving a first signal, at a microprocessor included within a battery on bus, from a power supply unit that supplies power to a central processing unit ("CPU"), determining, at the microprocessor, whether an additional power supply is able to provide extra power required by the CPU, the first signal defining a CPU acceleration mode indicating that power required by the CPU exceeds maximum power that can be provided by the power supply unit, wherein the power supply unit transmits the first signal as a logic signal to the battery on bus instead of to the CPU during an interval when power demand by the CPU exceeds peak power of the power supply unit; and
   in response to determining that the additional power supply is able to provide the extra power, supplying power from the battery on bus to the CPU by at least the additional power supply.

2. The method according to claim 1, further comprising:
   in response to determining that the additional power supply is unable to provide the extra power, transmitting a second signal to the CPU so as to reduce a clock frequency of the CPU.

3. The method according to claim 1, further comprising:
   in response to discontinuation of the first signal from the power supply unit, stopping the supplying power to the CPU by the additional power supply.

4. The method according to claim 1, further comprising:
   in response to the power supply unit powering down, supplying power to the CPU by the additional power supply.

5. An apparatus for supplying power to a central processing unit ("CPU"), comprising:
   a battery on bus including a microprocessor, the microprocessor is configured to, in response to receiving a first signal from a power supply unit that supplies power to a CPU, determine whether an additional power supply is able to provide extra power required by the CPU, the first signal defining a CPU acceleration mode indicating that power required by the CPU exceeds maximum power that can be provided by the power supply unit, wherein the battery on bus receives the first signal as a logic signal from the power supply unit during an interval when power demand by the CPU exceeds peak power of the power supply unit, and wherein the battery on bus is configured to, in response to determining that the additional power supply is able to provide the extra power, cause at least the additional power supply to supply power from the battery on bus to the CPU.

6. The apparatus according to claim 5, wherein the first signal is received via a first reserved pin of the apparatus.

7. The apparatus according to claim 5, further comprising:
a second signal transmitting module configured to, in response to determining that the additional power supply is unable to provide the extra power, transmit a second signal to the CPU so as to reduce a clock frequency of the CPU.

8. The apparatus according to claim 7, wherein the second signal is transmitted via a second reserved pin of the apparatus.

9. The apparatus according to claim 5, wherein in response to discontinuation of the first signal from the power supply unit, the microprocessor being further configured to cause the additional power supply to stop supplying power to the CPU.

10. The apparatus according to claim 5, wherein in response to the power supply unit powering down, the microprocessor being further configured to cause the additional power supply to supply power to the CPU.

11. An additional power supply for supplying power to a central processing unit ("CPU"), comprising:
an apparatus for controlling power supply to the CPU, the apparatus including a battery on bus including a microprocessor configured to:
in response to receiving a first signal from a power supply unit that supplies power to a CPU, determine whether the additional power supply is able to provide extra power required by the CPU, the first signal defining a CPU acceleration mode indicating that power required by the CPU exceeds maximum power that can be provided by the power supply unit, wherein the battery on bus receives the first signal as a logic signal from the power supply unit during an interval when power demand by the CPU exceeds peak power of the power supply unit; and
in response to determining that the additional power supply is able to provide the extra power, cause at least the additional power supply to supply power from the battery on bus to the CPU.

12. The additional power supply according to claim 11, wherein the first signal is received via a first reserved pin of the apparatus.

13. The additional power supply according to claim 11, wherein the apparatus is further configured to:
in response to determining that the additional power supply is unable to provide the extra power, transmit a second signal to the CPU so as to reduce a clock frequency of the CPU.

14. The additional power supply according to claim 13, wherein the second signal is transmitted via a second reserved pin of the apparatus.

15. The additional power supply according to claim 11, wherein the apparatus is further configured to:
in response to discontinuation of the first signal from the power supply unit, cause the additional power supply to stop supplying power to the CPU.

16. The additional power supply according to claim 11, wherein the apparatus is further configured to:
in response to the power supply unit powering down, cause the additional power supply to supply power to the CPU.

* * * * *